(12) United States Patent
Miyamori et al.

(10) Patent No.: US 7,382,076 B2
(45) Date of Patent: Jun. 3, 2008

(54) SPINDLE MOTOR (75) Inventors: Kenichi Miyamori, Takarazuka (JP); Shigeo Obata, Kobe (JP); Hiromitsu Noda, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 743 days.

(21) Appl. No.: 10/965,869

(22) Filed: Oct. 18, 2004

(65) Prior Publication Data
US 2005/0086678 A1 Apr. 21, 2005

(30) Foreign Application Priority Data
Oct. 21, 2003 (JP) .............................. 2003-360228

(51) Int. Cl.
*H02K 1/00* (2006.01)
(52) U.S. Cl. ..................................... 310/216; 310/67 R
(58) Field of Classification Search .............. 310/67 R, 310/89–90, 216–218, 254, 261
See application file for complete search history.

(56) References Cited

U.S. PATENT DOCUMENTS

| | | | |
|---|---|---|---|
| 4,303,843 A * | 12/1981 | Arnoux et al. ............ | 310/67 R |
| 5,661,351 A * | 8/1997 | von der Heide et al. . | 310/67 R |
| 6,104,113 A * | 8/2000 | Beifus ....................... | 310/68 B |
| 6,762,518 B1 * | 7/2004 | Yamaguchi et al. ...... | 310/67 R |
| 6,774,520 B2 * | 8/2004 | Wauke .................... | 310/156.45 |
| 7,098,567 B2 * | 8/2006 | Ionel et al. ................. | 310/216 |
| 2002/0089246 A1 * | 7/2002 | Wauke ....................... | 310/67 R |
| 2003/0011270 A1 * | 1/2003 | Takei .......................... | 310/216 |
| 2004/0061404 A1 * | 4/2004 | Fujii et al. .................. | 310/216 |

FOREIGN PATENT DOCUMENTS

| | | |
|---|---|---|
| JP | 8-111968 | 4/1996 |
| JP | 11-098792 | 4/1999 |

* cited by examiner

*Primary Examiner*—Thanh Lam
(74) *Attorney, Agent, or Firm*—Wenderoth, Lind & Ponack, L.L.P.

(57) ABSTRACT

The disclosed is a spindle motor most suitable for magnetic disk drives, optical disk drives or the like capable of constraining undesirable cogging torques to a low level and of winding a coil regularly. In particular, the inward periphery of magnetic pole of iron core for a stator includes of an arc shaped surface concentrically to the outward periphery of rotor magnet and a pair of flat surfaces, generally perpendicular to the centerline of magnetic pole, attached to both sides of the arc shaped surface peripherally. The configuration can reduce the cogging torques without any decrease in motor efficiency.

18 Claims, 9 Drawing Sheets

PRIOR ART

Fig. 9

SPINDLE MOTOR

FIELD OF THE INVENTION

The present invention relates to a spindle motor for use in hard disk drives, optical disk drives or the like and in particular, to an iron core capable of winding a coil regularly with ease and of constraining cogging torques in the spindle motor.

BACKGROUND ART

In recent years, various kinds of information equipment have been widely used which require disks an increased storage capacity, boosting to develop devices with a higher storage density, a compact sizing and low profile designing. Moreover, along with advances of downsizing and low profiling of the devices, a wire diameter for the coil wound on iron core of the stator of spindle motor has decreased and various winding methods for the wire has been developed.

Figure 9:
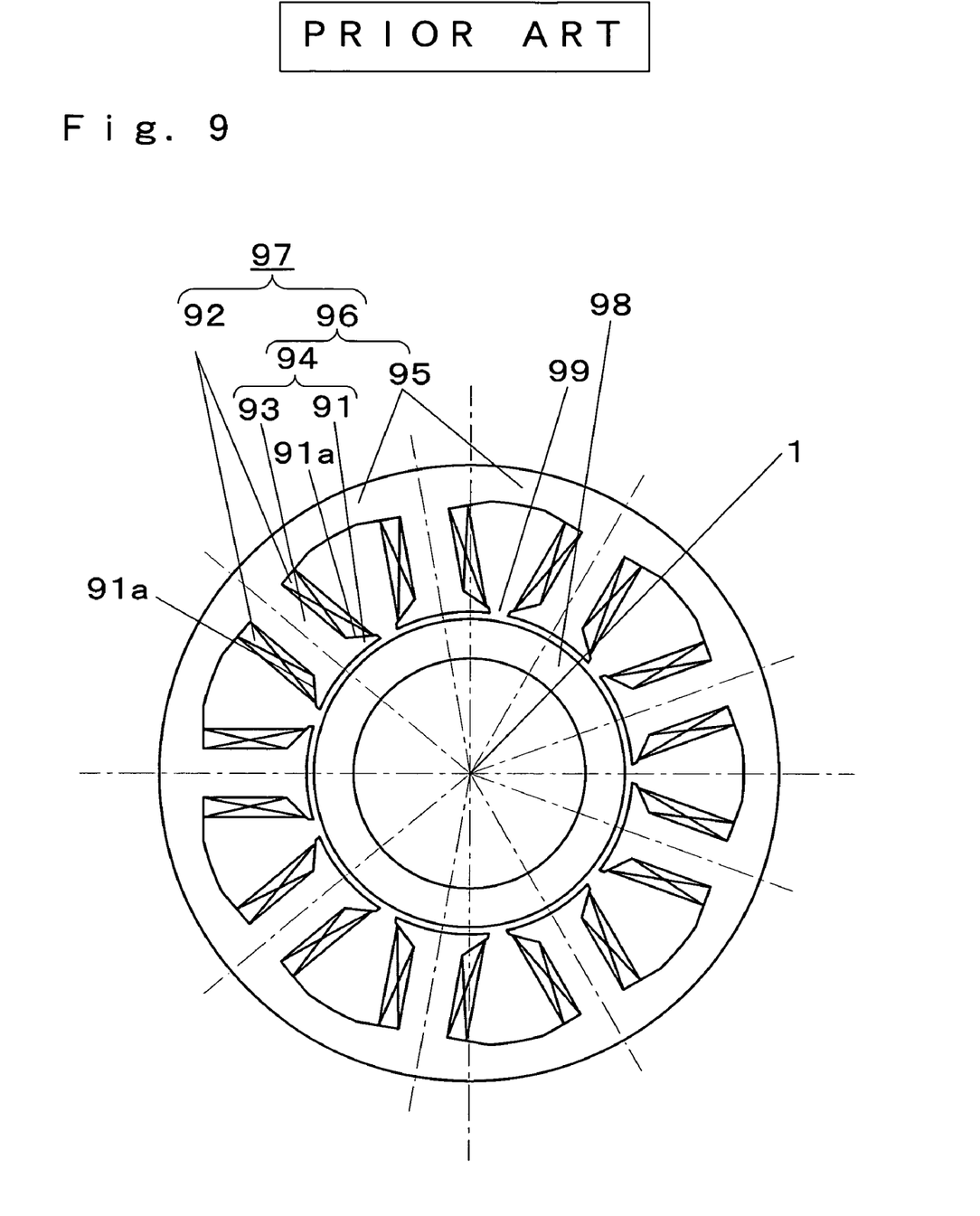
FIG. 9 illustrates a schematic cross-sectional view showing a stator and a rotor magnet used in a conventional spindle motor.

Next, an iron core of a stator for conventional spindle motor used in hard disk drives, optical disk drives or the like is described schematically with reference to drawings. FIG. 9 shows a schematic cross sectional view taken along a plane perpendicular to a rotation center of a portion of stator and rotor magnet of a conventional spindle motor.

In FIG. 9, an iron core comprises: a plurality of magnetic poles 94 having pole-tops 91 at both sides peripherally on the top facing rotation center 1 inwardly and straight portion 93 to wind a coil; and pole base 95 to join respective magnetic poles 94 outwardly. A plurality of iron layers made of for instance silicon steel plates or the like are laminated to form iron core 96; core 96 and coil 92 forms stator 97. The outward periphery of rotor magnet 98 including a plurality of magnetized sections faces the inward periphery of magnetic poles 94 of stator 97 across an air gap. Upon energizing, as well known, coil 92 generates magnetic fluxes allowing rotor magnet 98 including a plurality of magnetized sections to rotate. In such configuration having stator 97 and rotor magnet 98, the air gap between the inward periphery of magnetic pole 94 and rotor magnet 98 varies abruptly in the vicinity of clearance between pole-tops 91 of neighboring magnetic poles 94, or slots 99, causing the magnetic flux density to vary abruptly. Consequently, attractive forces between magnetic poles 94 and rotor magnet 98 vary abruptly causing cogging torques and ripple occurs in motor rotations. To constrain the abrupt variations in magnetic flux density between magnetic pole 94 and rotor magnet 98 in the vicinity of slots 99, pole-top 91 is formed such that a distance to surface 91a from rotation center 1 becomes smaller as it extends peripherally.

Additionally, examples of iron core design to constrain the generation of cogging are:

an inward periphery for a magnetic pole of the iron core has a larger radius of curvature than a distance between an intersection of the inward periphery with the centerline of the magnetic pole through the rotation center, or an inward periphery for a magnetic pole of the core has a plane perpendicular to the centerline of the magnetic pole (for instance, see Japanese Patent Unexamined Publications No. H8-111968 and H11-987920). Such core configurations can widen the air gap between the magnetic core and rotor magnet gradually from the center of inward periphery toward both ends of the pole-top. This results in gradual variations in attractive forces between magnetic poles 94 and rotor magnet 98 enabling motor to reduce cogging torque at rotation.

However, the conventional iron core configuration for the spindle motor has the problems of decreases in motor efficiency, as the air gap between the magnetic core and rotor magnet widens gradually from the center of inward periphery toward both ends of pole-top and that a distance to the surface of projection facing the pole-base from the rotation center becomes smaller as it extends peripherally.

Additionally, along with the progress in downsized and low profiled devices, the iron core of spindle motor requires a very thin wires to wind a coil and the regular winding technology using thin wires has become of great importance. However, in the iron core configuration of the stators shown in FIG. 9, surface 91a of pole-top 91, facing pole-base 95, intersects with straight portion 93 obtusely, causing difficulties to wind coils 92 using very thin wires on straight portion 93 of magnetic pole 94 regularly. Even if wound regularly, the regular windings of coil 92 is broken or likely to be broken due to a slight slack of the winding in the processes of winding, assembling after winding or at motor operation, causing difficulties to dispose the coils in a predetermined position properly. The problem is that in an extreme case coil 92 touches rotor magnet 98 owing to the broken coil windings to cause failures such as damaging the insulation layers of coil or the like resulting in a poor reliability of the motor operation.

SUMMARY OF THE INVENTION

The present invention aims at, to solve the aforementioned problems, providing a spindle motor with a stator capable of reducing cogging torques significantly without any decrease in motor efficiency and of winding a coil regularly with ease using thin wires, preventing the coiled style from being broken. To accomplish the purposes the spindle motor disclosed comprises:

a rotary spindle having a rotation center;

a rotor body provided with a circular rotor secured to the rotary spindle and magnets secured to the external periphery of the circular rotor;

an iron core provided with a plurality of magnetic poles having coiling portions and pole-tops provided on both sides of the coiling portion extending from the coiling portion peripherally and a pole-base to join magnetic poles;

a stator having coils wound around a plurality of magnetic poles;

a bearing sleeve holding the bearing to secure the rotary spindle rotatably; and a housing to secure the stator and the bearing sleeve, wherein the rotor magnet rotates around the rotation center facing the inward periphery of the iron core of stator. The inward periphery of the iron core includes a concentrically shaped surface to the outward periphery of the rotor and a pair of flat surfaces, generally perpendicular to the centerline of the magnetic pole, attached to both sides peripherally.

Moreover, angle $\alpha$ that respective intersections of the arc shaped surface of the inward periphery of the iron core with a pair of flat surfaces make to the rotation center, and angle $\beta$ that respective intersections of the coiling portion of the magnetic pole with the pole-top make to rotation center, are in a relation to satisfy the following equation: $\alpha \leq \beta$.

In this configuration, the inward periphery of pole-top has a surface concentrically to the outward periphery of the rotor magnet ranging generally same width of coiling portion of the magnetic pole causing no decrease in motor efficiency.

Moreover, the air gap between rotor magnet 4 and iron core 8 widens gradually over a pair of flat surfaces 31b, causing energy fluctuations from the gap to decrease gradually as away from centerline 23, thereby enabling the fluctuations of flux density passing inward periphery 31 to approximate a sine wave and to reduce cogging torques.

Additionally, in the spindle motor disclosed, surface of the projection facing the pole-base and surface of the pole base facing the pole-top are in parallel with each other and are generally perpendicular to the centerline of the magnetic pole. The length of the parallel surface of pole-base is equal to or longer than the length of the parallel surface of the projection.

The configuration can provide coiling portion of the magnetic pole with a regular winding easily preventing the coil style from being broken.

DETAILED DESCRIPTION OF THE INVENTION

Now, the preferred embodiments of the present invention are described with reference to drawings.

Preferred Embodiment 1

Figure 1:
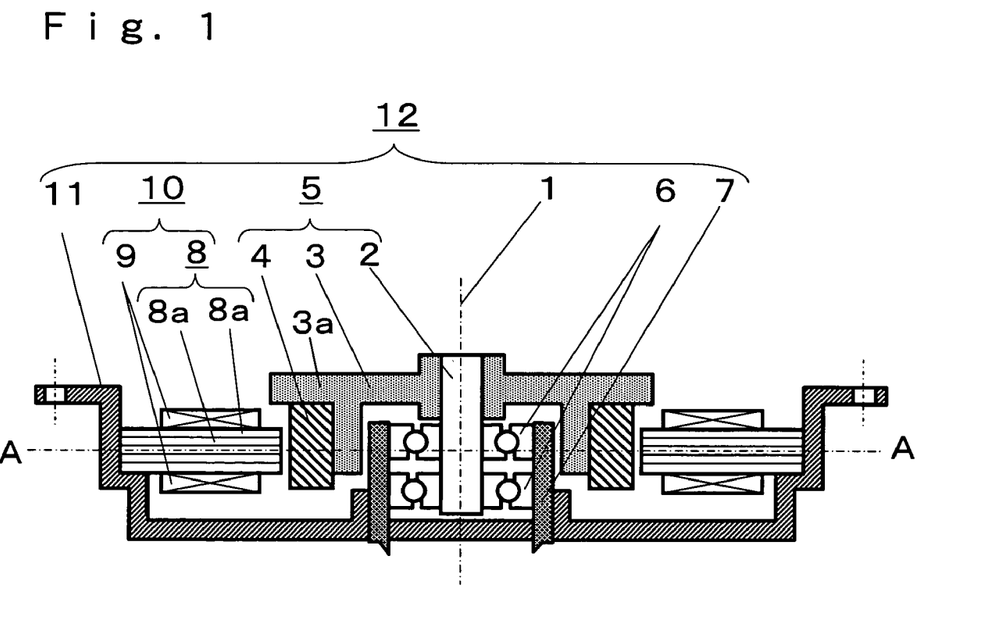
FIG. 1 illustrates a schematic cross-sectional view showing main parts of the spindle motor used in preferred embodiment 1 of the present invention.
Figure 2:
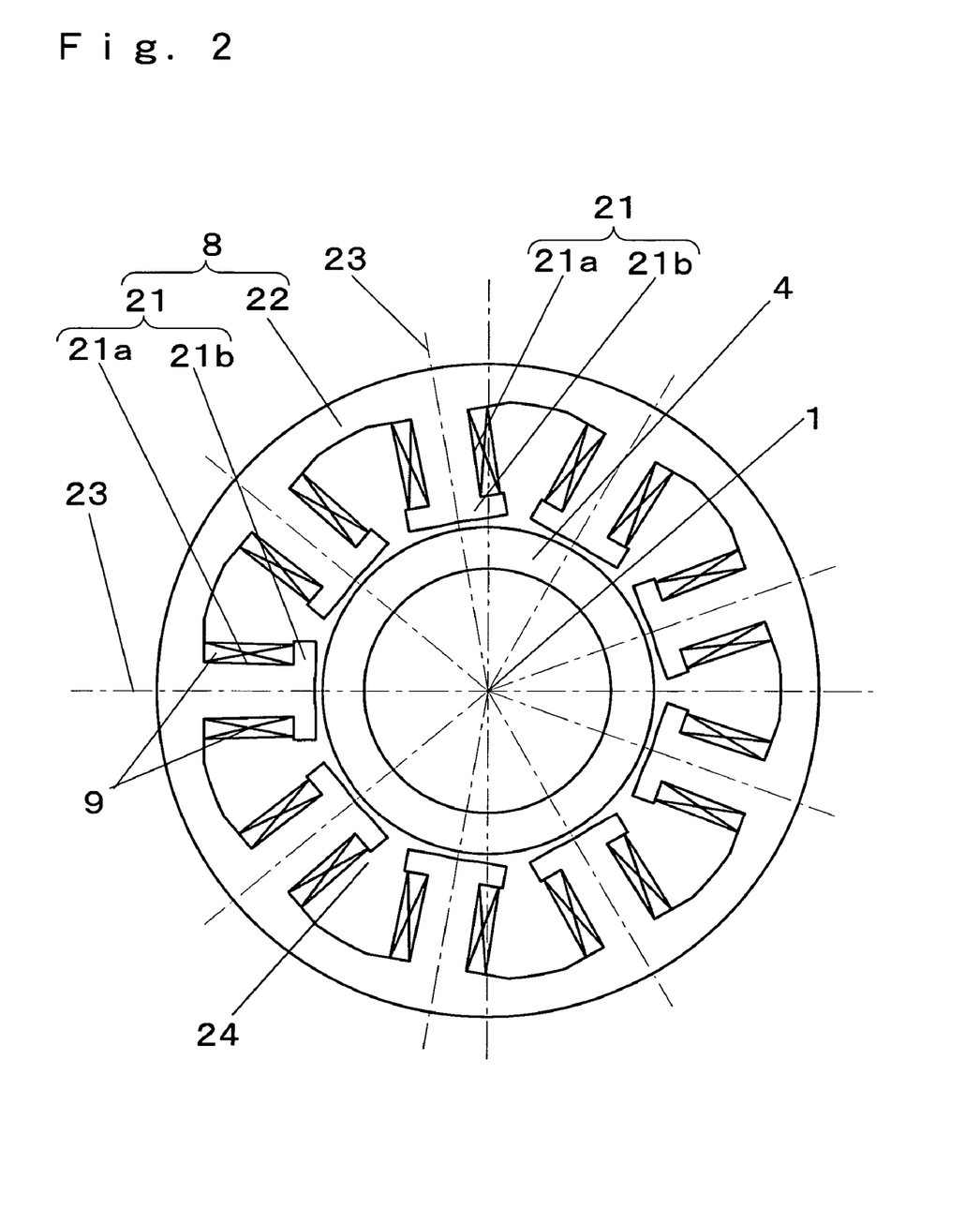
FIG. 2 illustrates a cross-sectional plan view taken along the plane A-A of the spindle motor shown in FIG. 1.
Figure 3:
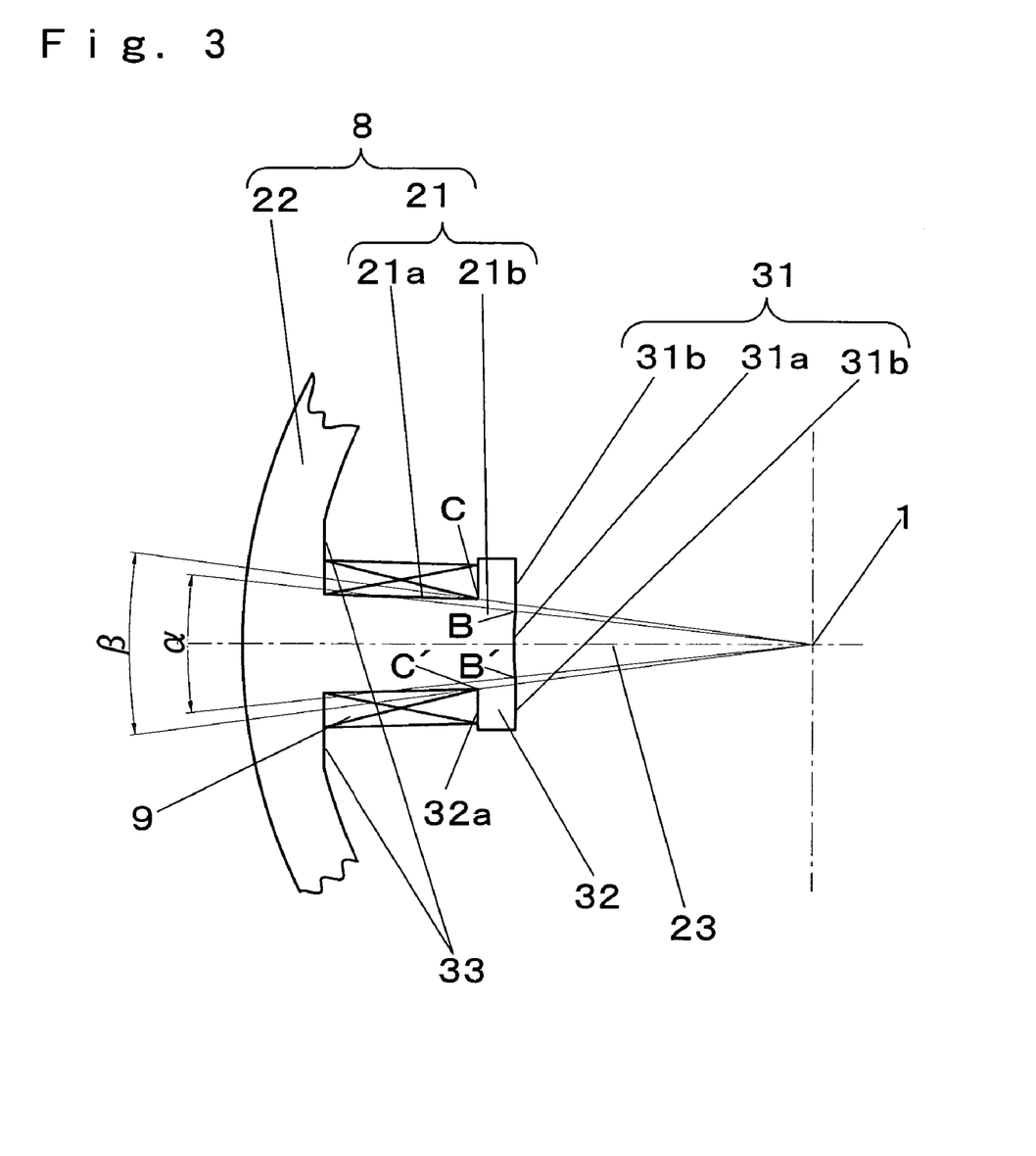
FIG. 3 illustrates a exploded view showing a magnetic pole and a portion joined to the pole-base of an iron core for a stator of the spindle motor.
Figure 4:
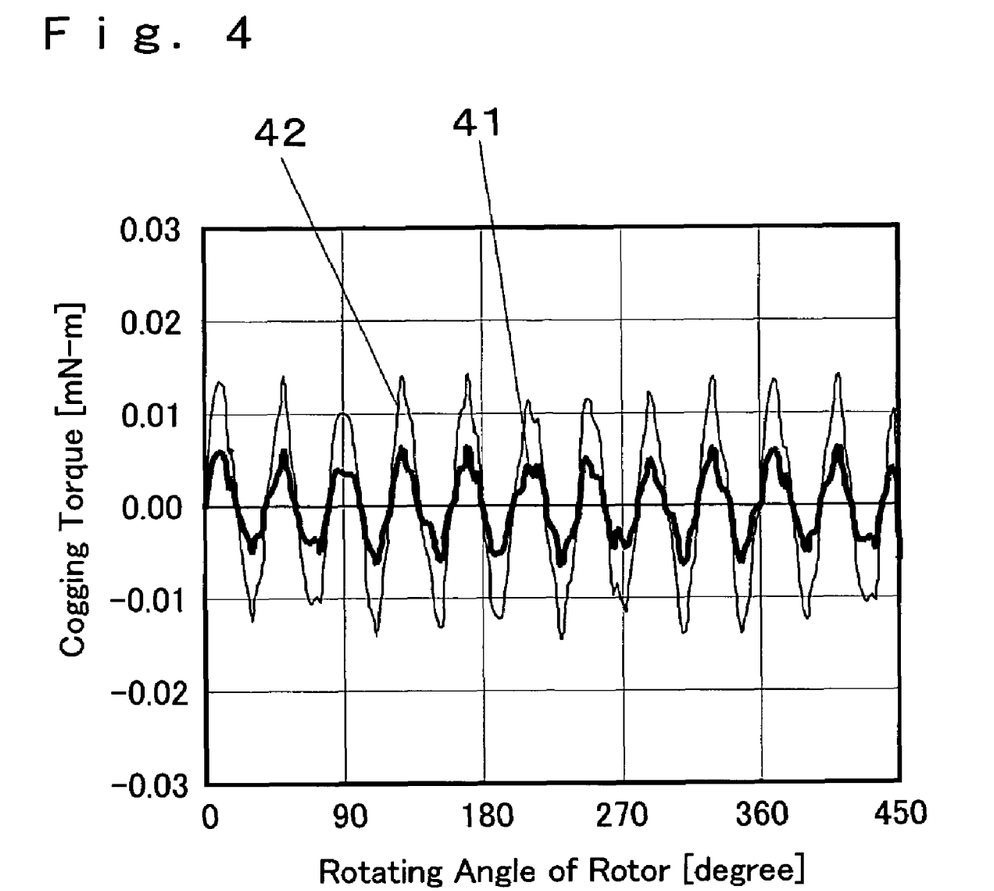
FIG. 4 illustrates a graph showing an example of cogging torques generated in the spindle motor.
Figure 5:
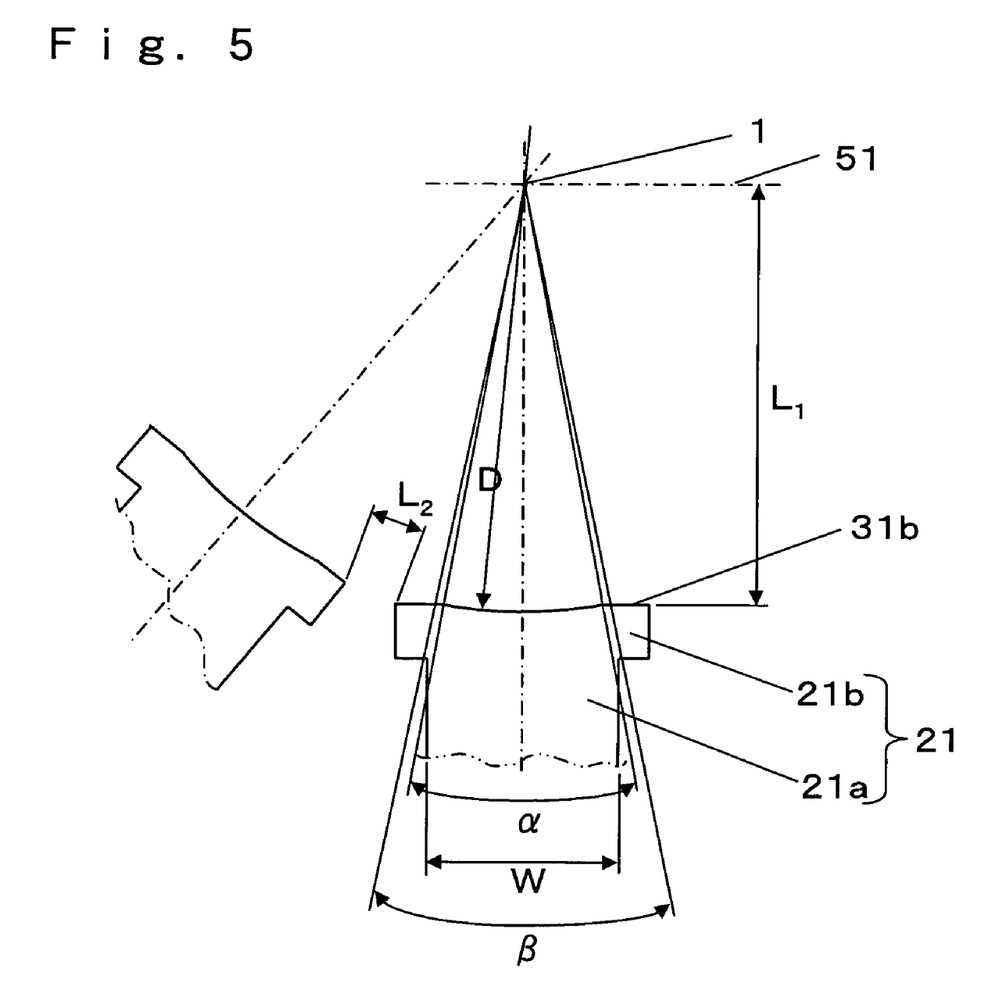
FIG. 5 illustrates a exploded view showing the shape of a magnetic pole of the iron core in the spindle motor used in preferred embodiment 1 of the present invention.

The spindle motor used in preferred embodiment 1 is described with reference to FIGS. 1 to 5. FIGS. 1, 2, 3, 4 and 5 are to describe the configuration of spindle motor used in preferred embodiment 1 and cogging torques. FIG. 1 illustrates a schematic cross-sectional view showing main parts of the spindle motor used in preferred embodiment 1 of the present invention, FIG. 2 illustrates a cross-sectional plan view taken along the plane A-A of the spindle motor shown in FIG. 1, FIG. 3 illustrates a exploded view showing a magnetic pole and a portion joined to the pole-base of an iron core for a stator of the spindle motor, FIG. 4 illustrates a graph showing an example of cogging torques generated in a spindle motor, and FIG. 5 illustrates a exploded view showing the shape of a magnetic pole of an iron core in a spindle motor to study cogging torques.

As shown in FIGS. 1 and 2, rotor 3 is secured to rotary spindle 2 rotating around rotation center 1 by a known method such as press fitting, adhesive bonding or the like. Rotor magnet 4 is secured to a bottom surface of flange 3a of rotor 3 by a known method such as press fitting, adhesive bonding or the like to form rotor body 5 including rotary spindle 2, rotor 3 and rotor magnet 4. Needless to say, spindle 2 and rotor 3 can be incorporated instead of formed from different materials individually.

On the other hand, bearing sleeve 7 securing ball bearing 6 that holds rotary spindle 2 rotatably and stator 10 having coil 9 wound on iron core 8 laminated a plurality of iron layers 8a are secured to chassis 11 by a known method such as press fitting, adhesive bonding, crimping, welding or the like. Stator 10 is mounted in spindle motor 12 such that inward periphery of iron core 8 faces outward periphery of rotor magnet 4 secured to rotor 4.

FIG. 1 illustrates a rotary spindle type bearing system in which rotary spindle 2 rotates in bearing sleeve 7 fixed on chassis 11. Needless to say, however, a fixed spindle type bearing system can be adopted in which bearing sleeve fixed on rotor 3 rotates around the rotation center 1 fixed to chassis 11. The bearing is not limited to the ball bearing only but a well known dynamic fluid bearing would be acceptable.

As shown in FIG. 2, iron core 8 formed of a plurality of laminated iron layers includes a plurality of magnetic poles 21 and pole-base 22 to join magnetic poles 21 radially, and magnetic pole 21 comprises coiling portion 21a to wind coil 9 and inward pole-top 21b.

Magnetic pole 21 is shaped such that the width of coiling portion 21a perpendicular to centerline 23 is equal to or larger in pole-base 22 side than in pole-top 21b side.

As shown in FIG. 3, inward periphery 31 of pole-top 21b of iron core 8 faces outward periphery of rotor magnet (not shown) across a small air gap, and in the vicinity of centerline 23 of magnetic pole 21, arc shaped surface 31a concentrically to outward periphery of rotor magnet 4 intersects with a pair of flat surfaces 31b in both outer sides peripherally.

At that time, angle α that a pair of intersections B and B' of arc shaped surface 31a with flat surfaces 31B make to rotation center 1, should be at least smaller than angle β that intersections C and C' of coiling portion 21a of magnetic pole 21 with pole-top 21b make to rotation center 1, or they are in the relation to satisfy the following equation:

$$\alpha \leq \beta \qquad \text{(equation 1)}$$

On the other hand, surfaces 32a, back side of projections 32 extending peripherally to both side, are formed to be generally perpendicular to centerline 23 of magnetic pole 21. Surfaces 33 on pole-base 22 are formed generally in parallel with surfaces 32a, or to be perpendicular to centerline 23 of magnetic pole 21. The width between both ends of surfaces 32a is generally equal to the width of inward periphery 31 of pole-top 21b. Surfaces 33, on pole-base 22, generally in parallel with surfaces 32a has a length equal to or longer than the length of surfaces 32a, and moreover a little bit longer than a thickness of coil 9 wound on coiling portion 21a of magnetic pole 21.

In spindle motor 12, inward periphery 31 of pole-top 21b facing rotor magnet 4 includes an arc shaped surface 31a concentrically to the outward periphery of rotor magnet 4 attached to a pair of flat surfaces 31b generally perpendicular to centerline 23. The configuration provides inward periphery 31 of pole-top 21b with an arc shaped surface 31a concentrically to the outward periphery of rotor magnet 4 generally ranging the width of coiling portion 21a, preventing spindle motor 12 from decreasing in motor efficiency. Moreover, the air gap between rotor magnet 4 and iron core 8 widens gradually over a pair of flat surfaces 31b, causing energy fluctuations from the gap to decrease gradually as away from centerline 23, thereby enabling the fluctuations of flux density passing inward periphery 31 to approximate a sine wave. Consequently, cogging torques in the spindle motor can be improved.

FIG. 4 illustrates a graph showing an example of cogging torques generated in a spindle motor. In FIG. 4, curve 41 (thick solid line) shows an example of cogging torques generated in the spindle motor of preferred embodiment 1, and curve 42 (thin solid line) shows an example of cogging torques generated in a conventional spindle motor. Here, FIG. 5 illustrates the shape of iron core in a spindle motor used for the study in preferred embodiment 1.

Dimensions of the iron core elements:
$D_0=\phi 21$ mm: outer diameter (not shown)
$D=\phi 11$ mm: inner diameter
$T=0.35$ mm: thickness (not shown)
$n=9$: number of magnetic pole (number of slot)
$W=2.4$ mm: width of magnetic pole
$L_2=1.1$ mm: clearance between neighboring magnetic poles
$L_1=5.42$ mm: distance between flat surface 31b and centerline 51 through rotation center 1 and parallel to surface 31b
$\alpha=21.3$ degree
$\beta=23.4$ degree.

Dimensions of the rotor magnet element (not shown in FIG. 5):
Outer diameter=$\phi 10.7$ mm
Inner diameter=$\phi 7.8$ mm
Thickness=0.35 mm
Residual flux density=1.36 T
Number of pole=12 poles
anisotropic magnetized.

Compared with the conventional iron core having an arc shaped surface for the inward periphery of the pole-top, the spindle motor having the pole-top with aforesaid shaping can reduce the cogging torques to about half as shown in FIG. 4

The kinds of magnet have great influences on cogging torques generated, curves 41 and 42 in FIG. 4 are, therefore, only to show an example of result of study on cogging torques by the spindle motor having aforesaid iron core configuration.

Generally, motor efficiency increases when angle α nears to angle β. However, as angle α decreases motor efficiency decreases and cogging torques decrease as well. Optimum values for angle α and β, therefore, should be determined to balance the motor efficiency and cogging torques according to the property required for the motor.

Additionally, surfaces 32a, back side of projections 32, and surfaces 33 on pole-base 22 are formed generally in parallel with each other and are perpendicular to centerline 23 of magnetic pole 21. The configuration can provide coiling portion 21a of magnetic pole 21 with a regular winding easily preventing the coil style from being broken.

The shape of magnetic pole 21 that the width of coiling portion 21a perpendicular to centerline 23 is equal to or larger in pole-base 22 side than in pole-top 21b side provides magnetic pole 21 with a low magneto-resistance enabling to increase magnetic fluxes and thereby to constrain vibrations generated by the motor rotation in magnetic pole 21 to a lower level.

The present invention is not so limited to the spindle motor having 9 slots as described in preferred embodiment 1 as an example shown in FIG. 2

As described in preferred embodiment 1, the inward periphery of pole-top, facing the rotor magnet, includes an arc shaped surface concentrically to the outward periphery of the rotor magnet attached to a pair of flat surfaces generally perpendicular to the centerline of the magnetic pole. The configuration can provide the spindle motor with an excellent rotation performance as energy fluctuations in the air gap between rotor magnet and iron core at motor rotation are lowered, enabling the fluctuations of flux density passing the inward periphery to approximate a sine wave to reduce cogging torques without any decrease in motor efficiency.

Moreover, surface of the projection facing the pole-base and surface on the pole-base facing the pole-top are formed to be generally in parallel with each other and are perpendicular to the centerline of magnetic pole. The configuration can provide the coiling portion of magnetic pole with a regular winding easily preventing the coil style from being broken, resulting in a downsized spindle motor with a high reliability.

Preferred Embodiment 2

Figure 6:
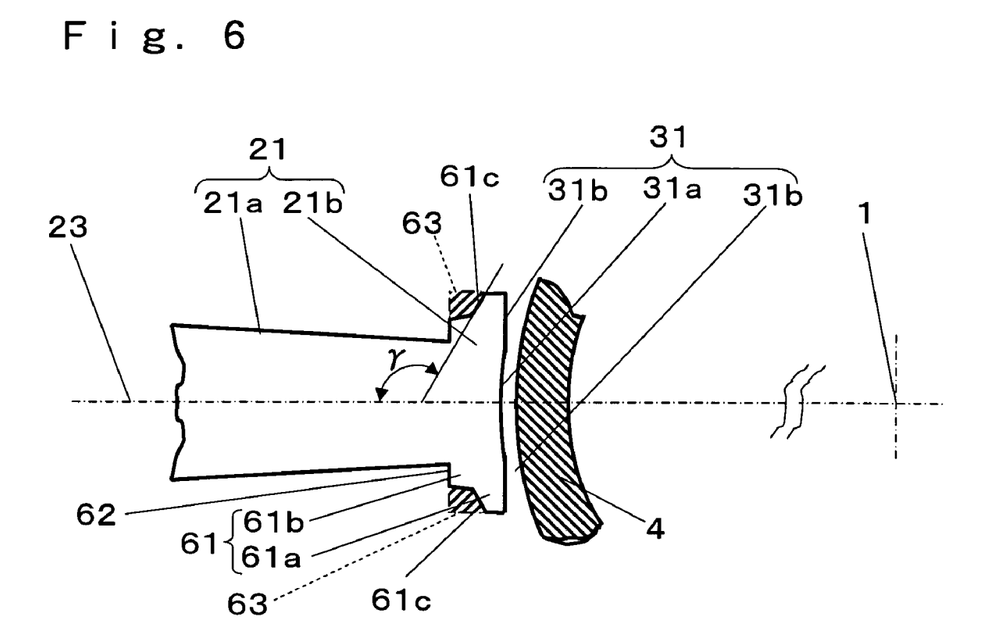
FIG. 6 illustrates a exploded view showing a pole-top of magnetic pole formed inwardly on the iron core for the spindle motor stator used in preferred embodiment 2 of the present invention.
Figure 7A:
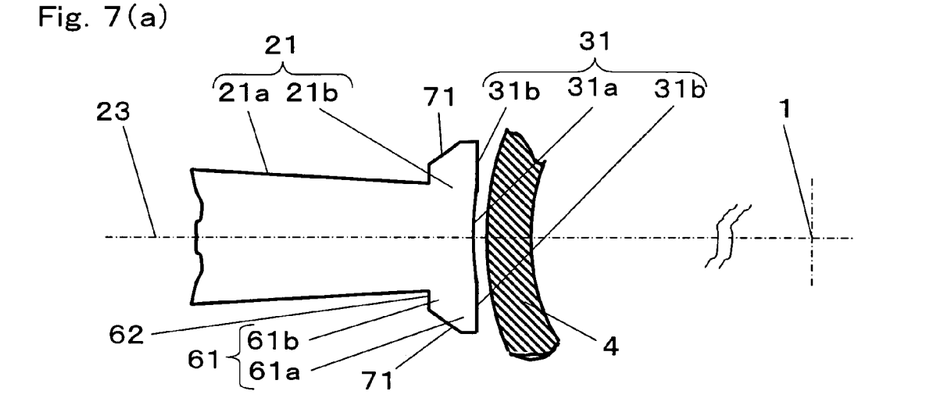
FIG. 7a illustrates a exploded view showing an example of a notch provided in the projection of a pole-top of magnetic pole.
Figure 7B:
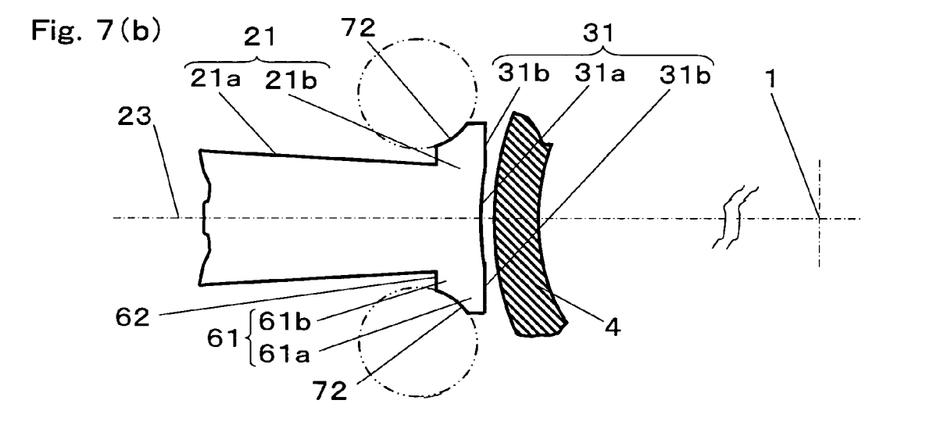
FIG. 7b illustrates a exploded view showing another example of a notch provided in the projection of a pole-top of magnetic pole.
Figure 7C:
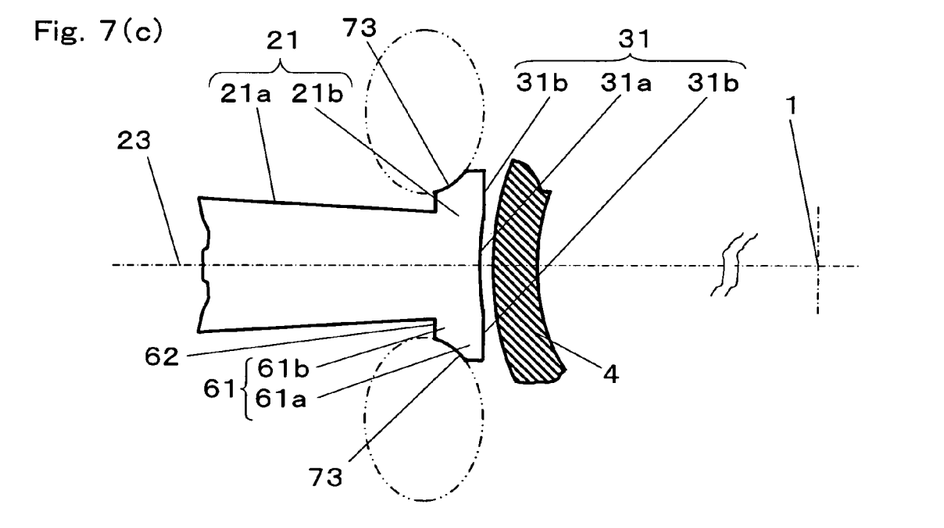
FIG. 7c illustrates a exploded view showing still another example of a notch provided in the projection of a pole-top of magnetic pole.

The configuration of the spindle motor used in preferred embodiment 2 is described with reference to FIGS. 6, 7a, 7b and 7c. FIG. 6 is a exploded view showing a pole-top of magnetic pole formed inwardly on an iron core for the spindle motor stator used in preferred embodiment 2 of the present invention, FIGS. 7a, 7b and 7c are exploded views showing respective examples of notches provided in the projections of pole-top of magnetic pole. In FIG. 6, the similar elements described previously in FIGS. 1, 2 and 3 have the same reference marks. The main parts of the spindle motor used in preferred embodiment 2 are similar to preferred embodiment 1 such:

that projection surfaces, against pole-base 22, of pole-top 21b of magnetic pole 21 and surfaces of pole-base 22 against the slot are generally in parallel with each other and are generally perpendicular to centerline 23 of magnetic pole 21, and that a width of coiling portion 21a perpendicular to centerline 23 of magnetic pole 21 is equal to or larger in pole-base 22 side than in pole-top 21b side, and still that inward periphery 31 of pole-top 21b magnetic pole 21 of iron core 8 has a concentrically shaped surface 31a to the outward periphery of rotor magnet 4 and a pair of flat surfaces 31b, generally perpendicular to centerline 23 of magnetic pole 21, attached to both sides peripherally, and is formed to satisfy the equation (1) described previously.

Main points different from preferred embodiment 1 are the shapes provided on projections of the pole-tops.

In FIG. 6, a rectangular shaped cutout 63 is removed off from projection 61 to form a branch including thin portion 61a and thick portion 61b. The width of thick portion 61b against centerline 23 is smaller than the width of thin portion 61a against the pole-base (not shown). Cutout surface 61c intersects with centerline 23 at an angle γ that satisfies the following equation:

$$\gamma \leq 90 \text{ degree} \quad \text{(equation 2)}$$

Moreover, surface 62 of thick portion 61b against the pole-base is generally perpendicular to centerline 23 of magnetic pole 21. In projection 61, surfaces of thin portion 61a and thick portion 61b are attached sequentially. Instead of the sequential attaching lines, the cutout can be formed such that outside end of surface 62 peripherally attaches to outside end of inward periphery continuously by a generally straight line, arc shaped curve, elliptical shaped curve or the like as shown in FIGS. 7a, 7b and 7c respectively.

Like aforesaid preferred embodiment 1, the cogging torques can be reduced significantly without any decrease in motor efficiency by the configuration that inward periphery 31, facing rotor magnet 4, of pole-top 21b of respective magnetic poles 21 of the iron core includes of a concentrically shaped surface to the outward periphery of rotor magnet 4 and a pair of flat surfaces 31b, generally perpendicular to centerline 23 of magnetic pole 21, attached to both sides peripherally.

Moreover, projection 61 of pole-top 21b on magnetic pole 21 is provided with a branch including thin portion 61a and thick portion 61b. Thin portions 61a provided at both ends of inward magnet 4 receive less fluxes from rotor magnet 4 enabling the fluctuations of flux density passing inward periphery 31 to approximate a sine wave, thereby causing cogging torques in the spindle motor to improve further.

As described above, preferred embodiment 2 can provide the effects similar to preferred embodiment 1. Moreover, the branch provided on the projection of pole tops can reduce energy fluctuations in the air gap between rotor magnet and iron core at motor rotation to constrain cogging torques without any decrease in motor efficiency causing flux density passing inward periphery to approximate a sine wave, thereby causing cogging torques to reduce further and can realize the spindle motor with an excellent rotation performance and a high reliability.

Preferred Embodiment 3

Figure 8:
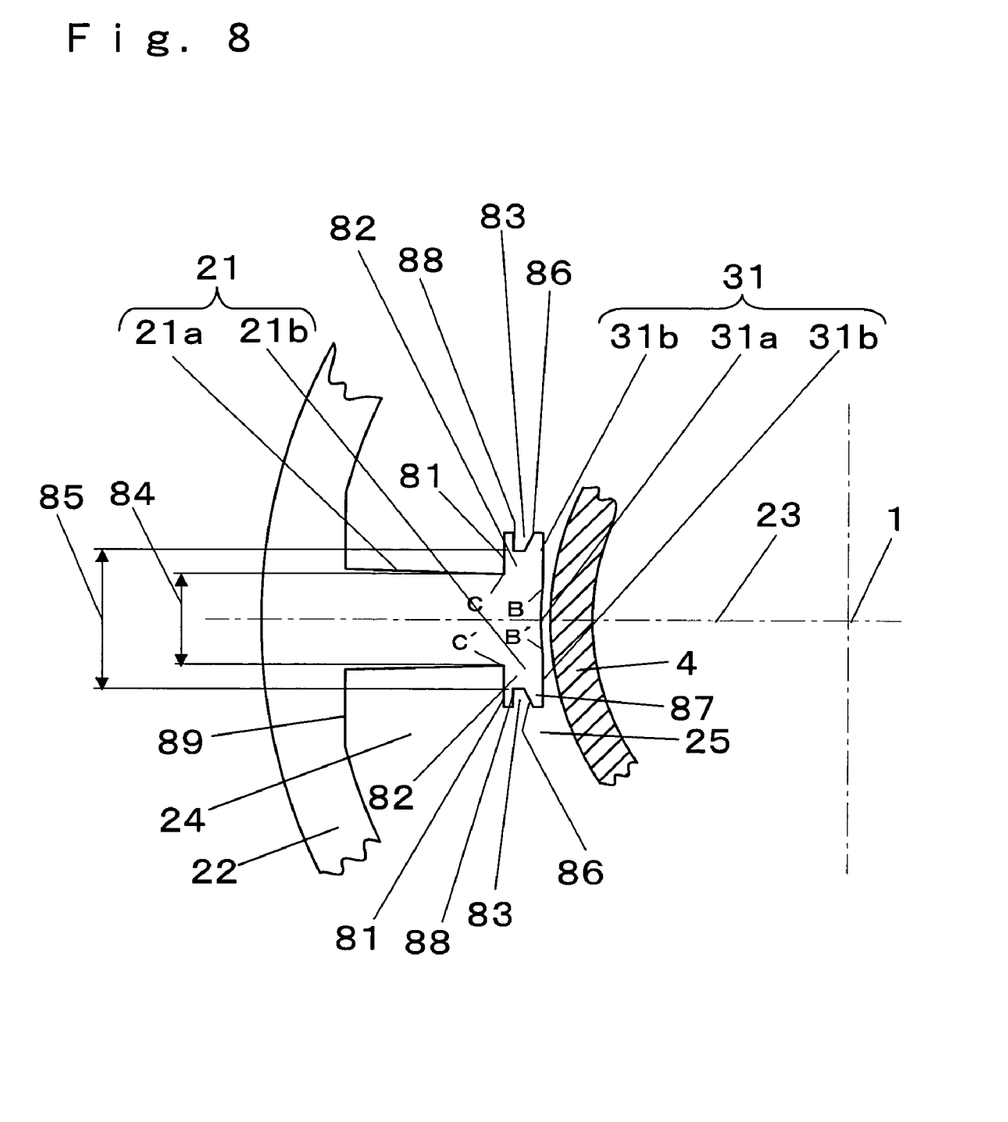
FIG. 8 illustrates a exploded view showing a pole-top of magnetic pole formed inwardly on an iron core for the spindle motor stator used in preferred embodiment 3 of the present invention.

The configuration of a spindle motor used in preferred embodiment 3 is described with reference to FIG. 8. FIG. 8 is a exploded view showing a pole-top formed inwardly on a magnetic pole of an iron core for the spindle motor stator used in preferred embodiment 3 of the present invention. In FIG. 8, the similar elements described previously in FIGS. 1, 2 and 3 have the same reference marks. The main parts of the spindle motor used in preferred embodiment 3 are similar to preferred embodiment 1 and 2 such:

that inward periphery 31 of pole-top 21b of magnetic pole 21 of iron core 8 has a concentrically shaped surface 31a to the outward periphery of rotor magnet 4 and a pair of flat surfaces 31b, generally perpendicular to centerline 23 of magnetic pole 21, attached to both sides peripherally, and is formed so as to angle α that a pair of intersections B and B' of arc shaped surface 31a with flat surfaces 31b make to rotation center 1, and angle β that intersections C and C' of coiling portion 21a with pole-top 21b make to rotation center 1, will satisfy the equation (1) described previously, and that projection surfaces 81, against pole-base 22, of pole-top 21b of magnetic pole 21 and surfaces 89 of pole-base 22 against slot 24 are generally in parallel with each other and are generally perpendicular to centerline 23 of magnetic pole 21, and a width of coiling portion 21a perpendicular to centerline 23 of magnetic pole 21 is equal to or larger in pole-base 22 side than in pole-top 21b side.

Main points different from preferred embodiment 1 and 2 are the shapes provided on projections of the pole-tops. Only the differences will be described here.

In FIG. 8, the points differ from preferred embodiment 1 and 2 significantly are:

that the width of surface 81 of pole-top 21b against pole-base 22 perpendicular to centerline 23 is generally equal to the width of pole-top 21b of inward periphery 31 perpendicular to centerline 23, and that projection 82 of pole-top 21b is provided with notch 83 between flat surface 31b of pole-top 21b and surface 81.

Next, the size and shape of the notch provided on projection 82 is described. The width 85 perpendicular to centerline 23 between both bottom surfaces of notches provided on both projections 82 is at least larger than the distance between the intersections C and C' of coiling portion 21a with pole-top 21b, or the width 84 perpendicular to centerline 23 of coiling portion 21a against pole-top 21b. Additionally, radial width of thin portion 87 of notch 83 between end surface 86 and flat surface 31b becomes at least thinner as it goes further peripherally, and on the other hand end surface 88 of notch 83 against surface 81 is generally in parallel with surface 81. End surface 88 of notch 83 is not necessarily in parallel with surface 81 but may be acceptable to make an obtuse angle with end surface 86.

As described in preferred embodiment 2, notch 83 provided on projection 82 between flat surface 31b and surface 81 reduces magnetic fluxes received from rotor magnet 4 in both sides of pole-top 21b peripherally. The fluctuation of flux density passing inward periphery 31 of pole-top 21b of magnetic pole 21 at rotation of rotor magnet can be approximated to a sine wave, causing cogging torques to reduce further. To avoid overlapping, however, a detailed description is omitted here.

In addition to the aforesaid effects, as the width of surface 81 of pole-top 21b is formed to have the same value of the width of inward periphery 31 perpendicular to centerline 23, coils (not shown) can be wound easily and can increase number of winding layer to contribute a downsized designing of the spindle motor.

As mentioned above, the spindle motor in preferred embodiment 3 has the configuration that the inward periphery of pole-top of the iron core includes a concentrically shaped surface to the outward periphery of the rotor magnet and a pair of flat surfaces, generally perpendicular to a centerline of the magnetic pole, attached to both sides peripherally, and additionally, the notch is provided in the projection of pole-top of magnetic pole. The configuration can show effects similar to preferred embodiment 1 and 2, and can increase the number of coiling layers for product downsizing to provide the spindle motor with an excellent rotation performance and a high reliability.

What is claimed is:

1. The spindle motor disclosed comprises:
a rotary spindle having a rotation center;
a rotor body provided with a circular rotor secured to the rotary spindle and rotor magnet secured to an external periphery of the circular rotor;
an iron core provided with a plurality of magnetic poles having coiling portions and pole-tops provided on both sides of the coiling portion extending from the coiling portion peripherally and a pole base to hold the magnetic poles;
a stator having coils wound around a plurality of the magnetic poles;

a bearing sleeve holding the bearing to secure the rotary spindle rotatably; and a housing to secure the stator and the bearing sleeve, wherein the rotor body rotates around the rotation center facing the outward periphery of the rotor magnet against the inward periphery of the iron core of the stator, and the inward periphery of the iron core includes a concentrically shaped surface to the outward periphery of the rotor magnet and a pair of flat surfaces, generally perpendicular to a centerline of the magnetic pole, attached to both sides peripherally.

2. The spindle motor of claim 1, wherein angle α that respective intersections of the arc shaped surface of the inward periphery of the iron core with a pair of the flat surfaces make to the rotation center, and angle β that respective intersections of the coiling portion of the magnetic pole with the pole-top make to rotation center, are in a relation to satisfy a following equation:

$$\alpha \leq \beta.$$

3. The spindle motor of claim 1, wherein a width of the coiling portion in the pole-base side perpendicular to the centerline of the magnetic pole is equal to or larger than a width of the coiling portion in pole-top side.

4. The spindle motor of claim 1, wherein the pole-base side surfaces of the projections extending peripherally from the coiling portion of the pole-top of the magnetic pole of the iron core, and slot side surfaces in both peripheral sides on the pole-base are formed to be generally in parallel with each other and are generally perpendicular to the centerline of the magnetic pole.

5. The spindle motor of claim 4, wherein a length of the surfaces of the pole-base against slot is equal to or longer than a length of the surfaces of the projections against the pole-base.

6. The spindle motor of claim 1, wherein the cutout formed such that a width of peripheral end of the projection against the rotor magnet, facing the centerline, is smaller than a width of peripheral end of the projection against the pole-base, facing the centerline, is removed off from the projection.

7. The spindle motor of claim 6, wherein the cutout is removed off from the projection of the iron core to form a branch including thin portion and thick portion.

8. The spindle motor of claim 4, wherein a surface, facing the pole-base, of the thin portion of the projection of the iron core makes approximately a right angle or an obtuse angle with the centerline of the magnetic pole through the rotation center.

9. The spindle motor of claim 7, wherein a surface, facing the pole-base, of the thick portion of the projection of the core is generally in parallel with a surface, facing a slot, on the pole-base and is generally perpendicular to the centerline.

10. The spindle motor of claim 9, wherein a length of the surface, facing a slot, on the pole-base is equal to or longer than a length of the surface, facing the pole-base, of the thick portion of the projection of the iron core.

11. The spindle motor of claim 6, wherein the cutout formed such that a peripheral end of the surface, facing the pole-base, of the projection of the iron core and an end of the inward periphery, facing the rotor magnet, are connected continuously by one of a generally straight line, an arc shaped curve and an elliptical shaped curve, is removed off from the projection.

12. The spindle motor of claim 1, wherein a notch is provided in the projection of the iron core between the flat surface of the inward periphery of the pole-top and the surface facing the pole-base.

13. The spindle motor of claim 12, wherein a width perpendicular to the centerline between both bottom surfaces of the notches provided on the projections in both sides peripherally is larger than a width of the coiling portion perpendicular to the centerline against the pole-top.

14. The spindle motor of claim 13, wherein a radial width of the thin portion of the notch between the end surface facing the rotor magnet and the flat surface becomes thinner as it extends peripherally.

15. The spindle motor of claim 2, wherein a notch is provided in the projection of the iron core between the flat surface of the inward periphery of the pole-top and the surface facing the pole-base.

16. The spindle motor of claim 3, wherein a notch is provided in the projection of the iron core between the flat surface of the inward periphery of the pole-top and the surface facing the pole-base.

17. The spindle motor of claim 4, wherein a notch is provided in the projection of the iron core between the flat surface of the inward periphery of the pole-top and the surface facing the pole-base.

18. The spindle motor of claim 5, wherein a notch is provided in the projection of the iron core between the flat surface of the inward periphery of the pole-top and the surface facing the pole-base.

* * * * *